(12) United States Patent
Pulz et al.

(10) Patent No.: US 8,983,841 B2
(45) Date of Patent: Mar. 17, 2015

(54) METHOD FOR ENHANCING THE PLAYBACK OF INFORMATION IN INTERACTIVE VOICE RESPONSE SYSTEMS

(75) Inventors: Gregory Pulz, Cranbury, NJ (US);
Steven Lewis, Middletown, NJ (US);
Charles Rajnai, Stroudsburg, PA (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 1530 days.

(21) Appl. No.: 12/173,437

(22) Filed: Jul. 15, 2008

(65) Prior Publication Data

US 2010/0017000 A1 Jan. 21, 2010

(51) Int. Cl.
*G10L 13/00* (2006.01)
*H04M 3/493* (2006.01)
*G10L 13/10* (2013.01)
*G10L 21/04* (2013.01)
*H04L 29/06* (2006.01)

(52) U.S. Cl.
CPC ............ *H04M 3/4936* (2013.01); *G10L 13/10* (2013.01); *G10L 21/04* (2013.01); *H04L 65/1096* (2013.01)
USPC ........... 704/258; 704/276; 704/275; 704/272; 704/270.1; 704/270; 704/252; 704/251; 704/240; 704/235; 704/233; 704/201; 455/445; 379/93.12; 379/88.18; 379/265.12

(58) Field of Classification Search
CPC . G10L 13/04; G10L 13/06; G10L 2021/0135; G10L 21/00; G10L 13/043; G10L 13/10; G10L 19/00; G10L 13/00
USPC ............. 704/276, 275, 272, 270.1, 270, 252, 704/251, 240, 235, 233, 201; 455/445; 379/93.12, 88.18, 265.12
See application file for complete search history.

(56) References Cited

U.S. PATENT DOCUMENTS

| | | | | |
|---|---|---|---|---|
| 5,825,856 A * | 10/1998 | Porter et al. | ............... | 379/93.12 |
| 5,850,629 A * | 12/1998 | Holm et al. | .................. | 704/260 |
| 6,161,092 A * | 12/2000 | Latshaw et al. | ............... | 704/270 |
| 6,513,009 B1 * | 1/2003 | Comerford et al. | ........... | 704/270 |
| 6,601,030 B2 * | 7/2003 | Syrdal | ........................... | 704/258 |
| 6,754,626 B2 * | 6/2004 | Epstein | ......................... | 704/235 |
| 6,839,670 B1 * | 1/2005 | Stammler et al. | .............. | 704/251 |
| 7,003,459 B1 * | 2/2006 | Gorin et al. | .................... | 704/240 |
| 7,062,439 B2 * | 6/2006 | Brittan et al. | ................. | 704/260 |
| 7,515,695 B1 * | 4/2009 | Chan et al. | ................. | 379/88.18 |
| 7,536,300 B2 * | 5/2009 | Hejna, Jr. | ....................... | 704/211 |
| 7,640,164 B2 * | 12/2009 | Sasaki et al. | .................. | 704/272 |
| 7,734,463 B1 * | 6/2010 | McKay | ......................... | 704/207 |
| 7,809,376 B2 * | 10/2010 | Letourneau et al. | .......... | 455/445 |
| 8,145,497 B2 * | 3/2012 | Ahn et al. | ...................... | 704/278 |
| 2001/0012999 A1 * | 8/2001 | Vitale et al. | .................... | 704/260 |

(Continued)

OTHER PUBLICATIONS

Sproat et al. "Text-to-Speech Synthesis" 1999.*

(Continued)

*Primary Examiner* — Michael Colucci
(74) *Attorney, Agent, or Firm* — Greenblum & Bernstein, P.L.C.

(57) ABSTRACT

A network communication node includes an audio outputter that outputs an audible representation of data to be provided to a requester. The network communication node also includes a processor that determines a categorization of the data to be provided to the requester and that varies a pause between segments of the audible representation of the data in accordance with the categorization of the data to be provided to the requester.

22 Claims, 7 Drawing Sheets

(56) References Cited

U.S. PATENT DOCUMENTS

| | | | |
|---|---|---|---|
| 2002/0069061 A1* | 6/2002 | Syrdal | 704/258 |
| 2002/0077821 A1* | 6/2002 | Case et al. | 704/260 |
| 2002/0116188 A1* | 8/2002 | Amir et al. | 704/235 |
| 2003/0004723 A1* | 1/2003 | Chihara | 704/260 |
| 2003/0014253 A1* | 1/2003 | Walsh | 704/260 |
| 2003/0191648 A1* | 10/2003 | Knott et al. | 704/275 |
| 2004/0030554 A1* | 2/2004 | Boxberger-Oberoi et al. | 704/260 |
| 2004/0140989 A1* | 7/2004 | Papageorge | 345/700 |
| 2004/0193421 A1* | 9/2004 | Blass | 704/258 |
| 2005/0055205 A1* | 3/2005 | Jersak et al. | 704/233 |
| 2005/0060759 A1* | 3/2005 | Rowe et al. | 725/143 |
| 2005/0094798 A1* | 5/2005 | Yacoub | 379/265.12 |
| 2005/0125232 A1* | 6/2005 | Gadd | 704/270.1 |
| 2005/0216264 A1* | 9/2005 | Attwater et al. | 704/239 |
| 2005/0261905 A1* | 11/2005 | Pyo et al. | 704/252 |
| 2006/0111916 A1* | 5/2006 | Chambers et al. | 704/276 |
| 2006/0136214 A1* | 6/2006 | Sato | 704/265 |
| 2006/0235688 A1* | 10/2006 | Bicego et al. | 704/254 |
| 2007/0136334 A1* | 6/2007 | Schleppenbach et al. | 707/101 |
| 2007/0180383 A1* | 8/2007 | Naik | 715/727 |
| 2007/0213982 A1* | 9/2007 | Xi et al. | 704/243 |
| 2008/0118051 A1* | 5/2008 | Odinak et al. | 379/265.09 |
| 2008/0140414 A1* | 6/2008 | Hejna | 704/270 |
| 2008/0201135 A1* | 8/2008 | Yano | 704/201 |
| 2008/0235025 A1* | 9/2008 | Murase et al. | 704/260 |
| 2009/0254345 A1* | 10/2009 | Fleizach et al. | 704/260 |
| 2009/0281794 A1* | 11/2009 | Ben-Haroush et al. | 704/201 |
| 2009/0299733 A1* | 12/2009 | Agapi et al. | 704/201 |

OTHER PUBLICATIONS

Vannier et al. "Pauses Location and Duration Calculated With Syntactic Dependencies and Textual Considerations for T.T.S. System" 1999.*

Winslow. "The Automatic Alteration of Rhythm in Synthesized Speech" 2006.*

Ward et al. "Automatic User-Adaptive Speaking Rate Selection" 2004.*

Ward et al. "Factors Affecting Speaking-Rate Adaptation in Task-Oriented Dialogs" May 9, 2008.*

* cited by examiner

METHOD FOR ENHANCING THE PLAYBACK OF INFORMATION IN INTERACTIVE VOICE RESPONSE SYSTEMS

BACKGROUND

1. Field of the Disclosure

The present disclosure relates to the field of communications. More particularly, the present disclosure relates to variably modifying audible data representations by an interactive voice unit, based upon a recipient's perceived familiarity with the data.

2. Background Information

Traditionally, interactive voice systems present or play back data strings, such as telephone numbers, confirmation numbers, social security numbers, etc. Conventionally, this data is presented or played back to users using either text-to-speech or various forms of concatenations of recordings. In conventional interactive voice systems, timing of presentation or playback of information (data strings, in particular) is uniform.

For example, a conventional interactive voice system may play back a telephone number to a user immediately after the user has entered the telephone number. On the other hand, a conventional interactive voice system may also present a telephone number that is not familiar to the user. In either type of audible data representation, timing of playback or presentation of information (data strings, in particular) by the conventional interactive voice system is uniform.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout several views of the drawings, and in which.

DETAILED DESCRIPTION

Figure 1:
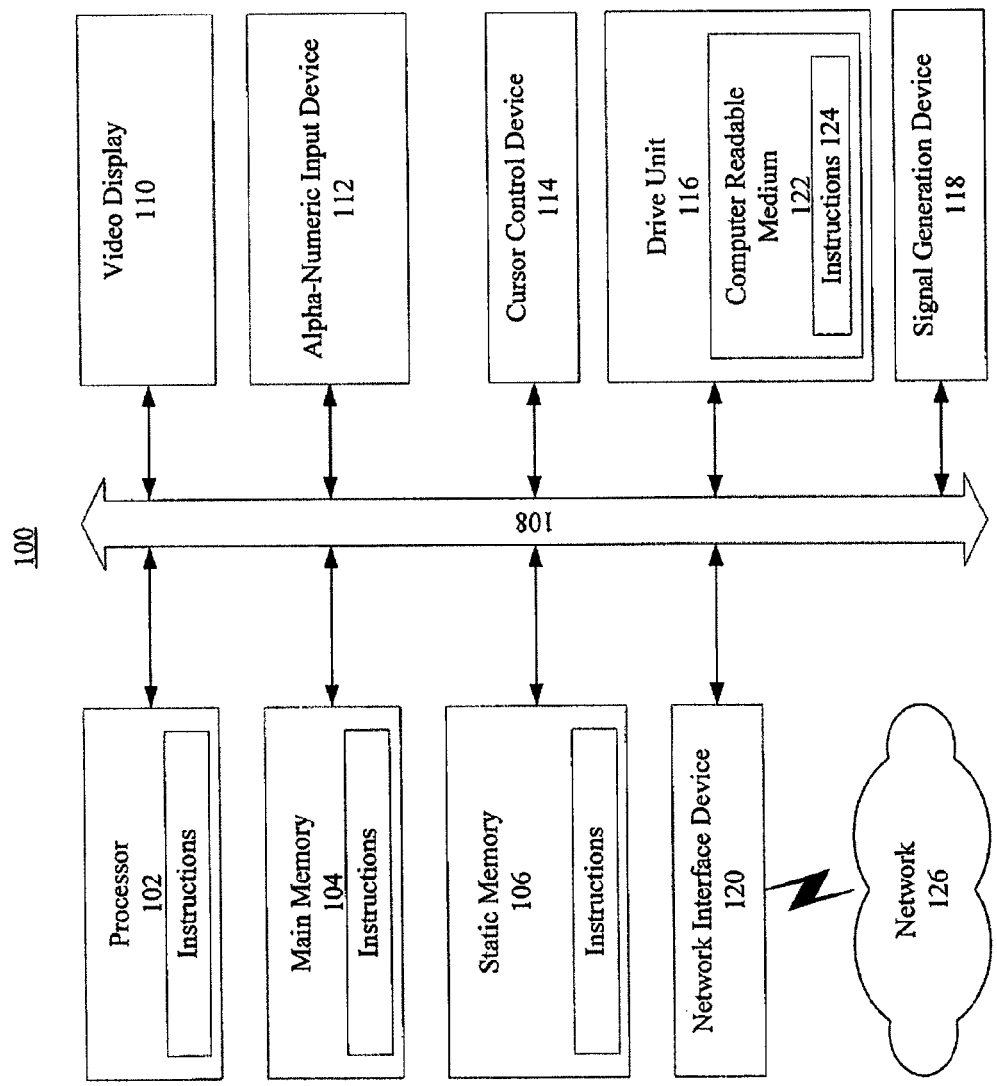
FIG. 1 illustrates an embodiment of a general computer system.

In view of the foregoing, the present disclosure, through one or more of its various aspects, embodiments and/or specific features or sub-components, is thus intended to bring out one or more of the advantages as specifically noted below.

According to an embodiment of the present disclosure, a network communication node includes an audio outputter that outputs an audible representation of data to be provided to a requester; and a processor that determines a categorization of the data to be provided to the requester and that varies a pause between segments of the audible representation of the data in accordance with the categorization of the data to be provided to the requester.

In another embodiment, the categorization varies in accordance with a perceived familiarity with the data to the requester.

In an embodiment, the aforementioned audible representation is obtained and output as part of a scripted call flow.

In yet another embodiment, the processor modifies the data by increasing a playback speed of the data, in accordance with the categorization of the data to be provided to the requester.

Alternatively, the processor modifies the data by adding pauses to the play back of the data, in accordance with the categorization of the data to be provided to the requester.

In one embodiment, the processor modifies the intonation of the playback of the data, in accordance with the categorization of the data to be provided to the requester.

In another embodiment, the network communication node includes an interactive voice unit. Furthermore, the interactive voice unit may be a voice over Internet protocol interactive voice unit.

According to another aspect of the present disclosure, a method for modifying an audible representation of data includes outputting the audible representation of data to be provided to a requester. The method includes determining a categorization of the data to be provided to the requester, and varying a pause between segments of the audible representation of the data in accordance with the categorization of the data to be provided to the requester.

In an embodiment, the categorization entails a quantified degree of perceived familiarity of the requester with the data.

In another embodiment, the method further entails executing a call flow script and receiving information associated with the perceived degree of familiarity of the requester with the data, based on the call flow script.

In an embodiment, the method also includes modifying the data by increasing a playback speed of the data, in accordance with the categorization of the data to be provided to the requester.

In yet another embodiment, the method includes modifying the data by adding pauses to the playback of the data, in accordance with the categorization of the data to be provided to the requester.

Alternatively, the method includes modifying the intonation of a playback of the data, in accordance with the categorization of the data to be provided to the requester.

In another embodiment, outputting of the audible representation is performed by a network communication node. This network communication node may be a voice over Internet protocol network communication node.

Another aspect of the present disclosure encompasses a computer readable medium for storing a computer program that modifies an audible representation of data. The computer readable medium includes an audio outputting code segment that outputs the audible representation of data to be provided to a requester. A processing code segment determines a categorization of the data to be provided to the requester and varies a pause between segments of the audible representation of the data in accordance with the categorization of the data to be provided to the requester.

The aforementioned processing code segment quantifies the degree of perceived familiarity of the requester with the data.

In another embodiment, the audio outputting code segment outputs a scripted call flow, and the processing code segment receives information associated with the perceived degree of familiarity of the requester with the data, based on the scripted call flow.

Furthermore, the processing code segment modifies the data by increasing a playback speed of the data, in accordance with the categorization of the data to be provided to the requester. Alternatively, the processing code segment modifies the data by adding pauses to the playback of the data, in accordance with the categorization of the data to be provided to the requester.

The processing code segment also modifies the intonation of the playback of the data, in accordance with the categorization of the data to be provided to the requester.

In view of the above, the present disclosure through one or more of its various aspects and/or embodiments is presented to accomplish one or more objectives and advantages, such as those noted below.

The various aspects and embodiments of the present disclosure are described in detail below.

FIG. 1 is an illustrative embodiment of a general computer system, on which a method to provide transparent voice registration and verification can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
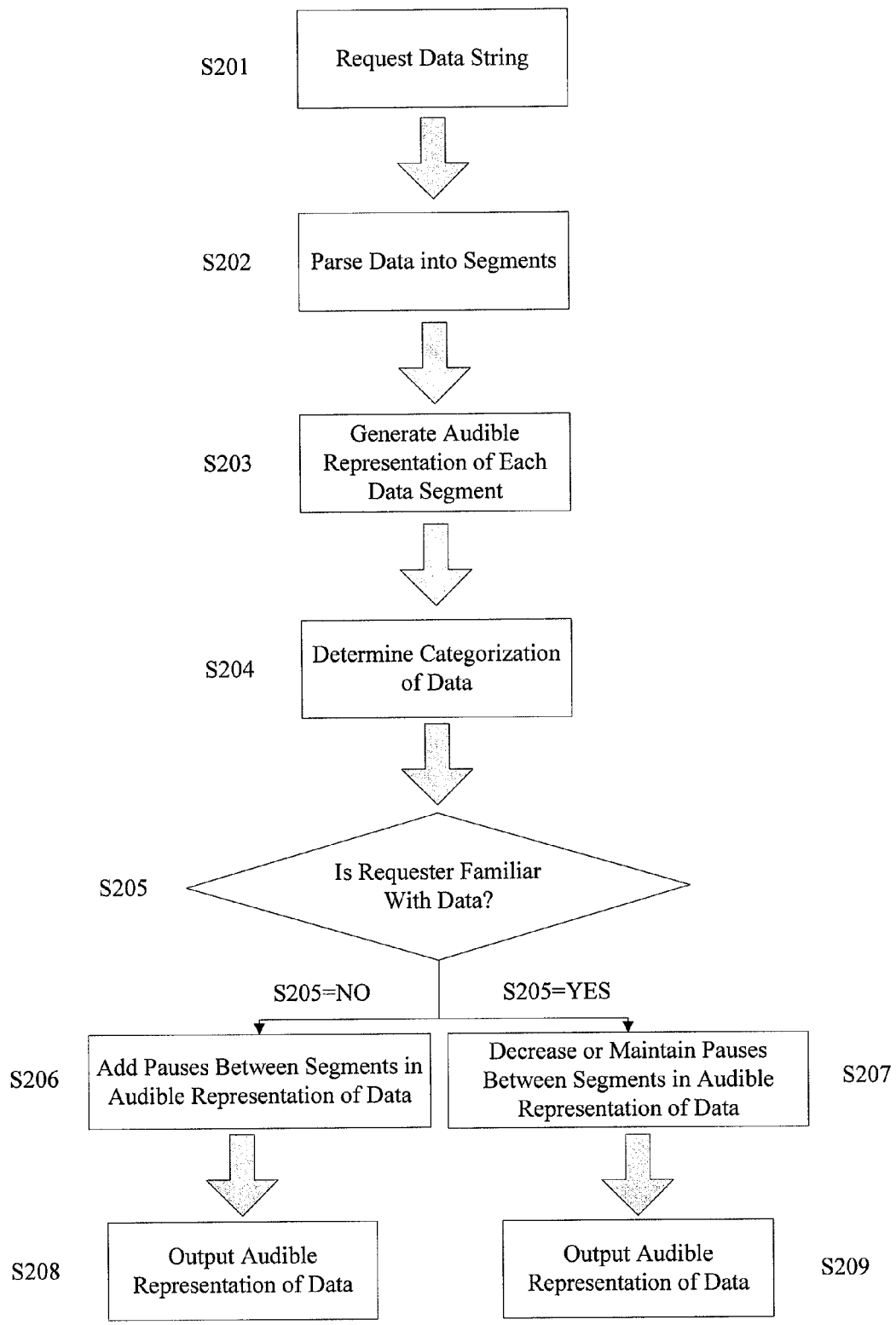
FIG. 2 is a flowchart depicting exemplary processing of a data string in a network communication node and the generation of an audible representation of the data string for a requester, according to an aspect of the present disclosure.

FIG. 2 shows a flowchart depicting exemplary processing of a data string in a network communication node and the generation of an audible representation of data or a data string for a requester, according to an aspect of the present disclosure. Initially, in step S201, a processor in the network communication node (or interactive voice unit) requests and receives a data string. Then, in step S202, the processor parses the data string into segments. The data string may be parsed into segments corresponding to individual characters of the string, i.e. the string may be parsed character by character.

Alternatively, the data string may be parsed into segments corresponding to natural speech. For example, the data string corresponding to a telephone number may be parsed into group subsets of numbers, e.g., 555-123-4567. These group subsets of numbers correspond to the manner in which the telephone numbers are generally conveyed in natural speech. Similarly, social security numbers and many credit card numbers have such natural groupings. The pauses between these grouping are sometimes, but not always, signaled by spacing or punctuation.

As an example, if it is known that 5551234567 is a telephone number, the processor may parse the telephone number to insert pauses corresponding to natural speech, although there are no spaces or punctuation in the data string. Alternatively, some arbitrary longer strings of digits or mixed alphanumerics can be parsed into smaller groups for the sake of comprehension or to facilitate the user's recollection of the data string, even if the groupings are arbitrary. For example, confirmation numbers are more easily remembered and written down if a string of N is parsed into group subsets (e.g., groups of 3 or 4 characters).

Then, in step S203, the processor generates an audible representation of each data segment. The audible representation of each data segment may be performed by a speech synthesizer using a database of stored speech corresponding to predetermined numbers, characters, words, or language units.

In step S204, the processor determines the categorization of the data. The processor may dynamically categorize the data or data strings using user input responsive to a scripted call flow or prompt. Alternatively, this categorization may be determined using a database of information stored during previous communications between the user and the network communication node. Of course, the categorization may be performed during different points in the process, including prior to even requesting and receiving the data string. As an example, the processor may determine a bank account balance will be unfamiliar before the data for the balance is requested, due to the variable nature of bank account balance information. On the other hand, the processor may determine that any information reported back to the requester to verify accuracy will be familiar to the user. It should also be noted that the generation of the audible representation of each of the data segments may be performed at a later time, after the processor determines the appropriate number of pauses to be inserted into the audible representation of the data or data string.

In the embodiment shown in FIG. 2, the categorization is based upon the user's perceived familiarity with the data. For example, a user's telephone number, date of birth, or social security number would be perceived as a number that is "familiar" to the user, while the user would perceive a new account number or a new invoice number as "unfamiliar."

The processor will determine that a confirmation number is new and will be perceived as "unfamiliar" to the user, if the application, connected to the interactive voice unit, recently generated the confirmation number. Similarly, if the user recently provided a data string to the interactive voice unit, the processor will determine that the number will be perceived as "familiar" to the user. Furthermore, certain types of data strings will be categorized as being perceived as "familiar" information (e.g., social security numbers, credit card numbers, the user's own telephone number). Similarly, certain types of account numbers will be categorized as having a lesser perceived familiarity, even if they were just provided by a user (e.g., billing account numbers).

In one embodiment, an interactive voice unit prompts the user to indicate whether the data string is familiar. In another embodiment, the processor queries a database for stored user information and predetermined categorization for stored user information, in order to determine whether the user has previously entered or previously received the data string. Thus, in step S205, the processor applies Boolean logic to determine whether to modify the audible representation of data strings. Specifically, if the processor determines that the user is not familiar with the data or data string, the processor adds pauses between segments. Alternatively, if the processor determines that the user is familiar with the data or data string, the processor decreases or maintains pauses between segments. The processor may determine a range of numeric quantifiers (rather than using binary logic) corresponding to user's perceived familiarity to the data. Thus, certain types of data strings will be connected with a quantified degree of perceived familiarity. For example, a user's social security number may be categorized as having a high or highest level of quantified degree of perceived familiarity (i.e., 5 out of a range from 0 to 5). Similarly, a recently generated confirmation number may be categorized as having a low or lowest level of quantified degree of perceived familiarity (i.e., 0 out of a range from 0 to 5).

In step S206, the processor adds millisecond pauses between segments in the audible representation of the data or data string. Conversely, in step S207, the processor decreases or maintains the number of millisecond pauses in the audible representation of the data or data string. If the processor categorizes the data using a range of numeric quantifier (rather than using binary logic) corresponding to a user's perceived familiarity with the data, the processor may alternatively add, decrease, or maintain the number of pauses between segments of the audible representation, based upon the value of the numeric quantifier.

Finally, in steps S208 and S209, an audio outputter outputs the audible representation of the data or the data string. As noted above, the present disclosure encompasses embodiments in which the method described above is implemented by software programs executable by a computer system.

Figure 3:
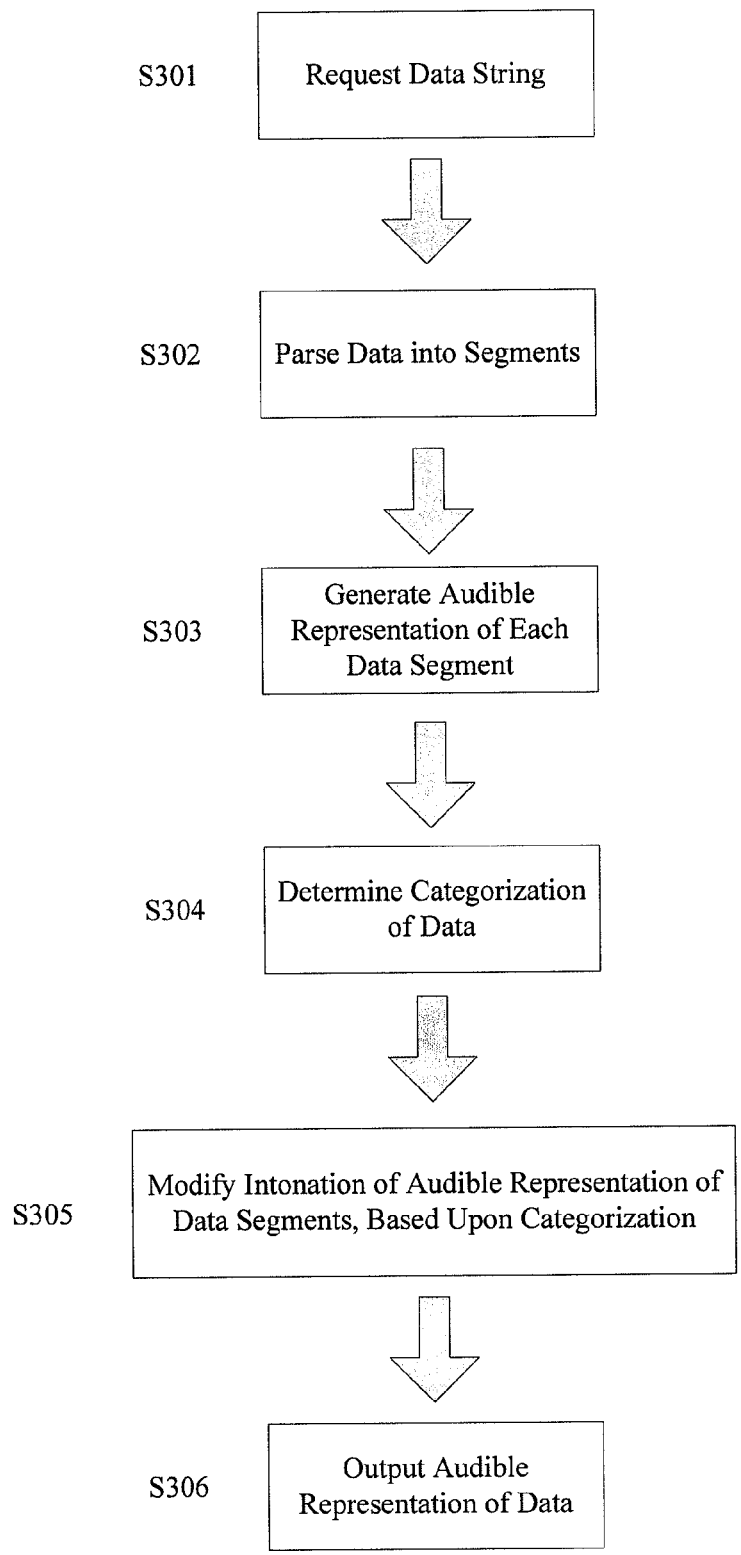
FIG. 3 is a flowchart depicting exemplary processing of a data string in a network communication node, according to an aspect of the present disclosure.

FIG. 3 shows another flowchart depicting exemplary processing of a data string in a network communication node, according to an aspect of the present disclosure. Similar to FIG. 2, in step S301, a processor in the network communication node (or interactive voice unit) requests and receives a data string. Then, in step S302, the processor parses the data string into segments. The data string may be parsed into segments corresponding to individual characters of the string or segments corresponding to natural speech. Then, in step S303, the processor generates an audible representation of each data segment. The audible representation of each data segment may be performed by a speech synthesizer using a database of stored speech corresponding to predetermined numbers, characters, words, or language units.

Then, in step S304, the processor determines the categorization of the data. As discussed above, the processor may categorize the data or data strings, using user input in response to a scripted call flow or prompt. Alternatively, this categorization may be based upon a database of information stored during previous communications between the user and the network communication node. Furthermore, the categorization (as described above) may be performed during points in the process other than that shown in FIG. 3. For example, the audible representation of each of the data segments may be performed at a later time, after the processor determines the appropriate number of pauses to be inserted into the audible representation of the data or data string. This categorization may be performed in the same manner discussed in step S205 above.

In step S305, the processor may modify the intonation and/or stress of the audible representation, based upon the aforementioned categorization. For example, the processor may modify the audible representation to create a rising intonation or falling intonation, in order to make the audible representation more closely resemble natural speech. Alternatively, the processor may vary the intonation, based upon linguistic patterns related to a particular language.

Finally, in step S306, the audio outputter outputs the audible representation of the data or the data string.

Figure 4:
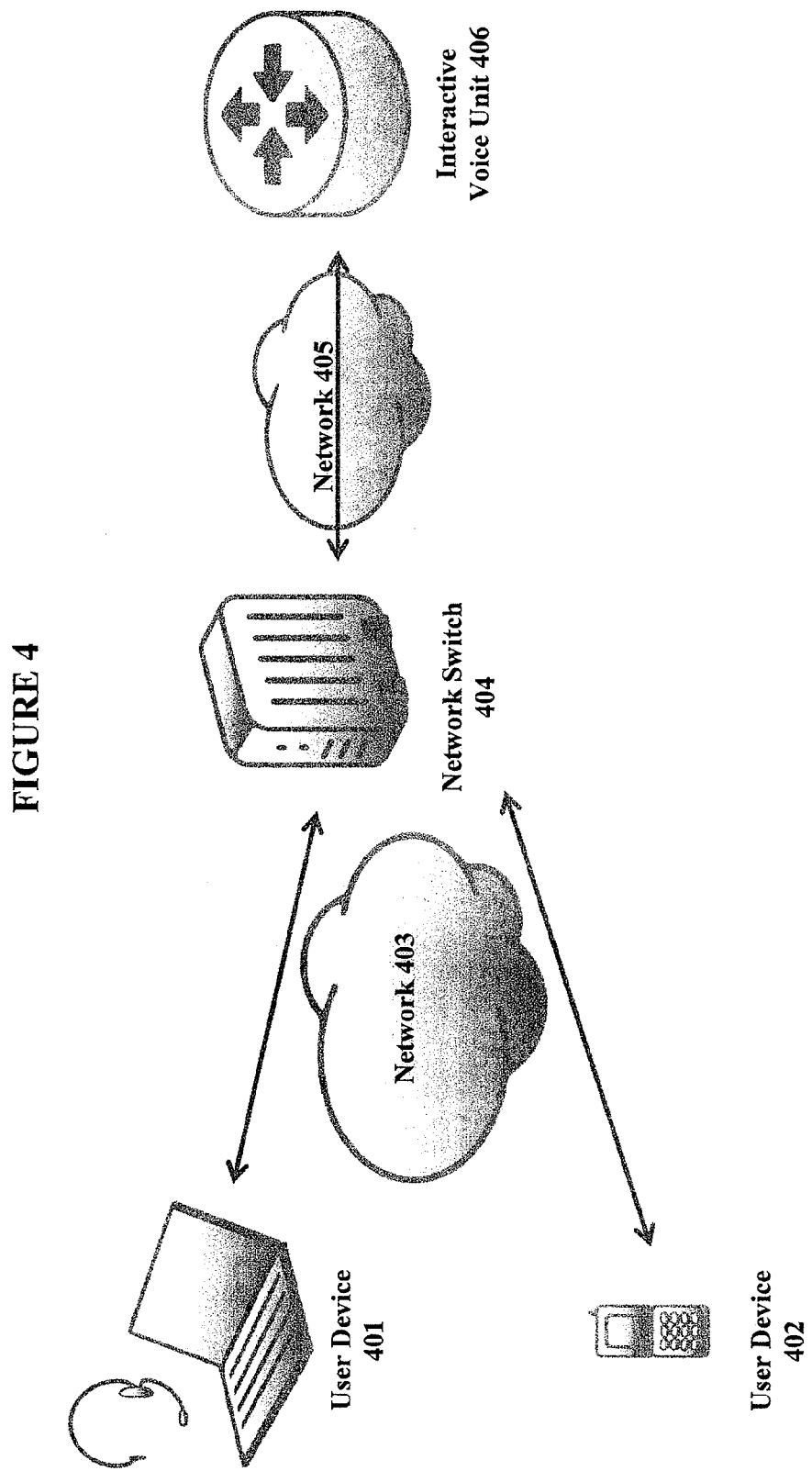
FIG. 4 is a block diagram depicting an exemplary network architecture, according to an aspect of the present disclosure.
Figure 5:
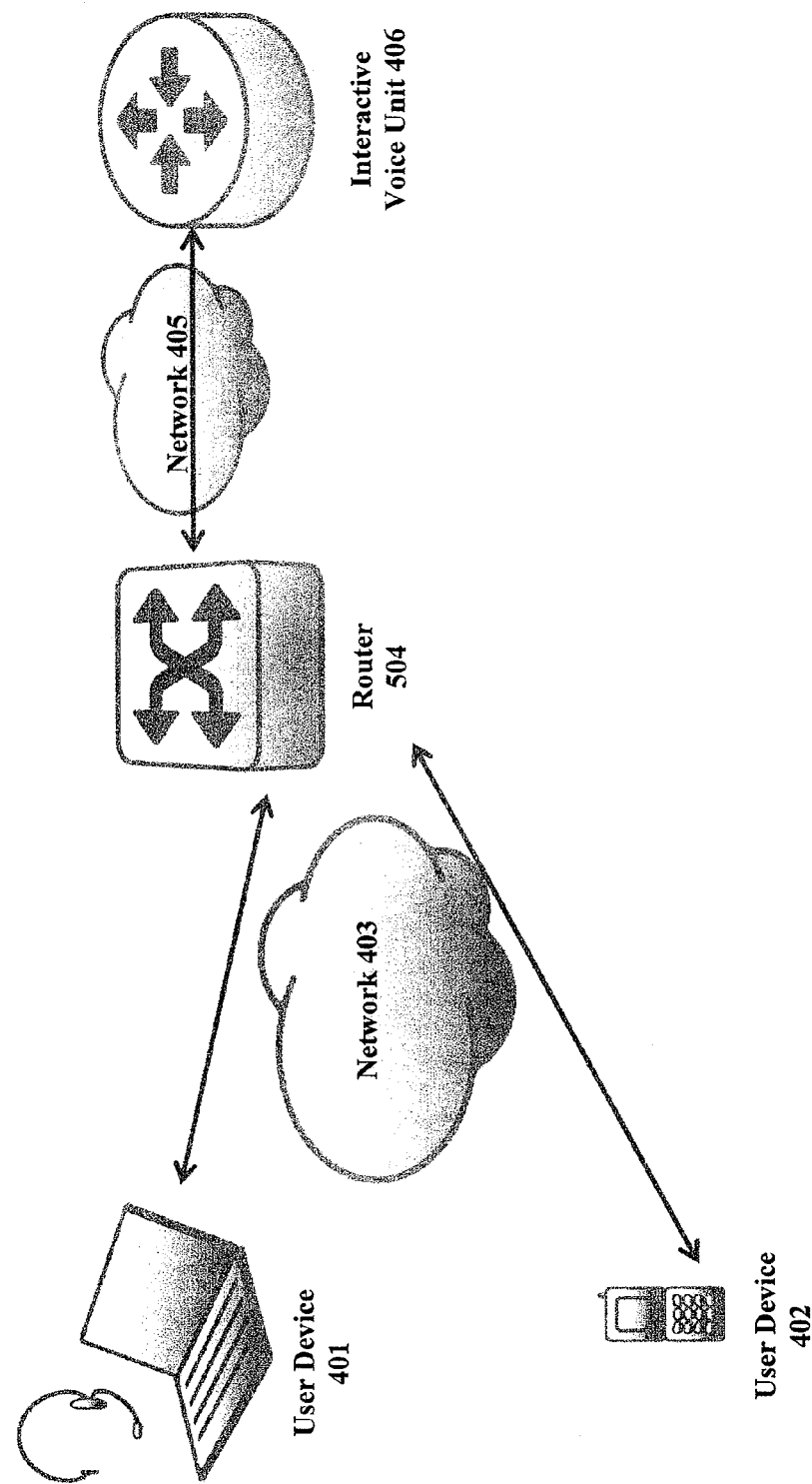
FIG. 5 is a block diagram depicting an exemplary network architecture, according to an aspect of the present disclosure.
Figure 6:
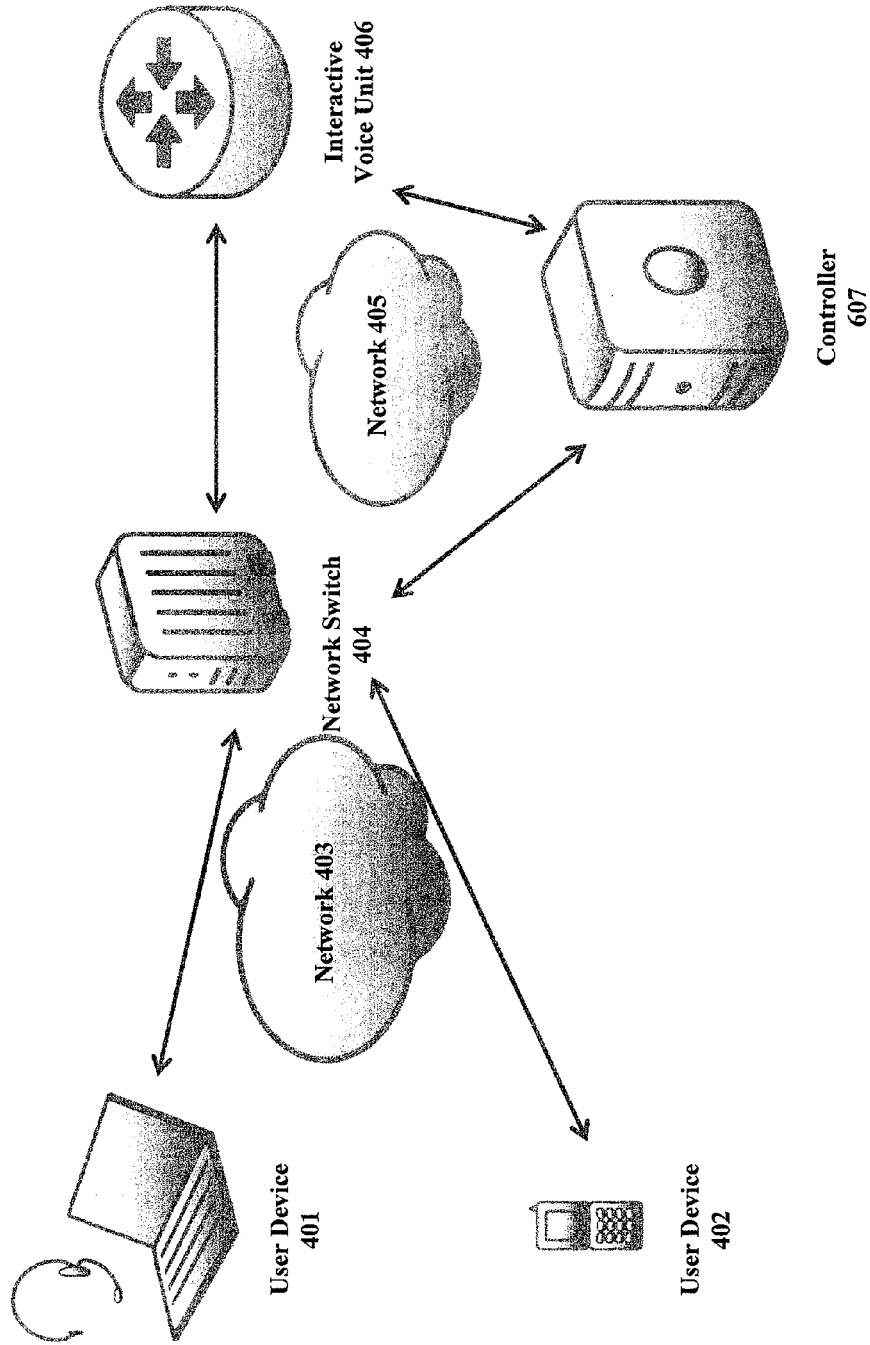
FIG. 6 is a block diagram depicting an exemplary network architecture, according to an aspect of the present disclosure.

FIGS. 4 through 6 show various exemplary architecture and configuration for the network communication node. For example, FIG. 4 is a block diagram depicting an exemplary network architecture, according to an aspect of the present disclosure. In FIG. 4, user devices 401 and 402, may be used by users (or callers) in an analog, digital, or IP telephone network systems. Thus, the network system may be a public switched telephone network (PSTN), digital telephone network system, a voice over Internet protocol (VOIP) telephony network system, or any other audible communication network.

In the exemplary architecture in FIG. 4, user devices 401 and 402 are connected to a network communication node, e.g., interactive voice unit 406, via network switch 404. User devices 401/402 may be connected to interactive voice unit 406 via one or multiple networks, e.g., networks 403 and 405. It is understood that the network communication node may be implemented in any data network(s) accessible by the users, including (but not limited to) wide area networks (WANs), PSTNs, and the Internet (using, e.g., voice over Internet protocol), without departing from the spirit and scope of the present disclosure.

It should also be noted that network switch 404 may be any conventional network switch, including (but not limited to) router 504, as shown in FIG. 5.

In yet another embodiment, shown in FIG. 6, the interactive voice unit 406 is controlled by controller 607, which controls and/or manages services provided by interactive voice unit 406. The controller may be, for example, a service control point (SCP), which is used to store and provide call routing instructions and interactive instructions for a service provided by the interactive voice unit 406.

Figure 7:
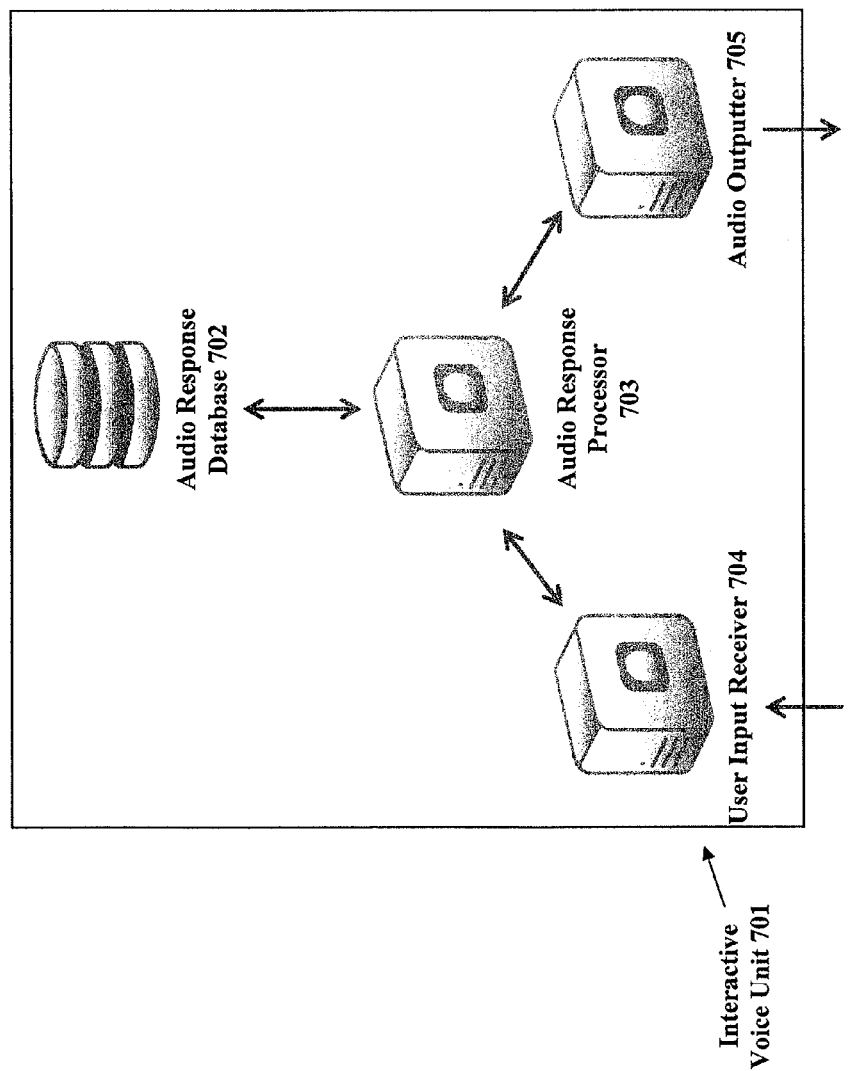
FIG. 7. is a block diagram depicting an exemplary architecture of an interactive voice unit, according to an aspect of the present disclosure.

In FIG. 7, an exemplary interactive voice unit 701 is shown. Interactive voice unit 701 modifies and outputs an audible representation of data and data strings to a user. In order to process and generate the aforementioned audible representation of data or data strings, interactive voice unit may use user input and previously stored user information to categorize the data or data strings.

Initially, user input receiver 704 receives user input in the form of dual-tone multi-frequency (DTMF) signals (entered through a telephone keypad of the user), natural language speech, or input from a user information database (not shown). In one embodiment, user input may be entered in response to user prompts in a scripted call flow.

This scripted call flow or prompt may be generated using standard markup languages used for specifying interactive voice dialogues in interactive voice units, such as VoiceXML (VXML) or SALT (Speech Application Language Tags). Scripted call flows or prompts may be generated using other standards for speech recognition and synthesis, e.g., SRGS (Speech Recognition Grammar Specification), SISR (Semantic Interpretation for Speech Recognition), SSML (Speech Synthesis Markup Language), PLS (Pronunciation Lexicon Specification), CCXML (Call Control Extensible Markup Language).

Based on the user input, audio response processor 703 determines a categorization of the data or data string (as discussed with respect to FIGS. 1 and 2). Audio response processor 703 also parses the data or data string into segments, and generates audible representation of each parsed data segment, using stored speech from audio response database 702. It should be noted that audio response database 702 may be a separate unit, which is not integrated within interactive voice unit 701. Based upon the categorization of the data or data strings, audio response processor 703 determines whether to add, decrease, or maintain a predetermined number of pauses between the parsed data segments. Finally, audio outputter 705 generates and outputs the audible representation of the data strings with the appropriate number of pauses inserted between the parsed data segments.

Accordingly, the present disclosure enhances users' cognitive processing of data strings that are presented to users from an interactive voice unit.

Although the present disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the present disclosure may also be implemented by automated voice message applications, which generate outbound voice messages to user devices using synthesized speech. In such an example, the present disclosure would allow automated voice message application to vary the play back of data strings, based on a categorization of the data strings (e.g., the perceived familiarity of the data string).

Alternatively, the present disclosure could also be implemented by voice mail systems. In this embodiment, a voice mail system with speech recognition software could capture data strings in a stored voice mail message, and then parse and categorize the data string in the voice mail message, so that play back of the section of the voice mail comprising the audible representation of the data string is varied based upon the categorization.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosure is not limited to such standards and protocols. For example, standards and protocols for the Internet and other packet switched network transmission (e.g., VoIP, VoiceXML, SALT, SRGS, SISR, SSML, PLS, CCXML) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A network communication node, comprising:
a memory that stores instructions; and
a processor that executes the instructions,
wherein, when executed, the instructions cause the processor to generate an audible representation of data to be provided to a requester, determine a categorization of the data to be provided to the requester, and, based on the instructions, automatically vary a pause between segments of the audible representation of the data in accordance with the categorization of the data to be provided to the requester and after the audible representation of the data is generated.

2. The network communication node according to claim 1, wherein the categorization varies in accordance with a perceived familiarity with the data to the requester.

3. The network communication node according to claim 1, wherein the audible representation is obtained and output as part of a scripted call flow.

4. The network communication node according to claim 2, wherein the processor modifies the data by increasing a playback speed of the data, in accordance with the categorization of the data to be provided to the requester.

5. The network communication node according to claim 2, wherein the processor modifies the data by adding pauses to the playback of the data, in accordance with the categorization of the data to be provided to the requester.

6. The network communication node according to claim 2, wherein the processor modifies the intonation of the playback of the data, in accordance with the categorization of the data to be provided to the requester.

7. The network communication node according to claim 1, wherein the network communication node comprises an interactive voice unit.

8. The network communication node according to claim 7, wherein the interactive voice unit service node comprises a voice over Internet protocol interactive voice unit.

9. A method for modifying an audible representation of data, comprising:
generating the audible representation of data to be provided to a requester;
determining, by a processor of a network communication node, a categorization of the data to be provided to the requester; and
based on prerecorded instructions, automatically varying a pause between segments of the audible representation of the data in accordance with the categorization of the data to be provided to the requester and after the audible representation of the data is generated.

10. The method for modifying an audible representation of data according to claim 9,
wherein the categorization comprises a quantified degree of perceived familiarity of the requester to the data.

11. The method for modifying an audible representation of data according to claim 9, further comprising:
executing a call flow script and receiving information associated with a perceived degree of familiarity of the requester to the data, based on the call flow script.

12. The method for modifying an audible representation of data according to claim 10, further comprising:
modifying the data by increasing a playback speed of the data, in accordance with the categorization of the data to be provided to the requester.

13. The method for modifying an audible representation of data according to claim 10, further comprising:
modifying the data by adding pauses to the playback of the data, in accordance with the categorization of the data to be provided to the requester.

14. The method for modifying an audible representation of data according to claim 10, further comprising:
modifying the intonation of a playback of the data, in accordance with the categorization of the data to be provided to the requester.

15. The method for modifying an audible representation of data according to claim 9,
wherein the generating of the audible representation is performed by a network communication node.

16. The method for modifying an audible representation of data according to claim 15,
wherein the network communication node is a voice over Internet protocol network communication node.

17. A non-transitory computer readable tangible medium for storing a computer program that modifies an audible representation of data, the computer program, when executed by a processor of a network communication node, causing a the network communication node to:
generate the audible representation of data to be provided to a requester; and
based on instructions in the computer program, automatically determine a categorization of the data to be provided to the requester and vary a pause between segments of the audible representation of the data in accordance with the categorization of the data to be provided to the requester and after the audible representation of the data is generated.

18. The non-transitory computer readable medium according to claim 17,
wherein the computer program further causes the network communication node to quantify a degree of perceived familiarity of the requester to the data.

19. The non-transitory computer readable medium according to claim 17,
wherein the computer program further causes the network communication node to generate a scripted call flow and receive information associated with the perceived degree of familiarity of the requester to the data, based on the scripted call flow.

20. The non-transitory computer readable medium according to claim 18,
wherein the computer program further causes the network communication node to modify the data by increasing a playback speed of the data, in accordance with the categorization of the data to be provided to the requester.

21. The non-transitory computer readable medium according to claim 18,
wherein the computer program further causes the network communication node to modify the data by adding pauses to the playback of the data, in accordance with the categorization of the data to be provided to the requester.

22. The non-transitory computer readable medium according to claim 18,
wherein the computer program further causes the network communication node to modify intonation of a playback of the data, in accordance with the categorization of the data to be provided to the requester.

* * * * *